United States Patent
Gazzard et al.

(10) Patent No.: US 7,346,348 B1
(45) Date of Patent: Mar. 18, 2008

(54) SELECTIVE RETRY OF ATTACH AND LOCATION UPDATE PROCEDURES

(75) Inventors: Daryl Gazzard, Alpharetta, GA (US); John Carvalho, Slough (GB)

(73) Assignee: AT&T Mobility II, LLC, Atlanta, GA (US)

( * ) Notice: Subject to any disclaimer, the term of this patent is extended or adjusted under 35 U.S.C. 154(b) by 421 days.

(21) Appl. No.: 10/740,527

(22) Filed: Dec. 22, 2003

(51) Int. Cl.
*H04Q 7/20* (2006.01)

(52) U.S. Cl. ............. 455/432.3; 370/353; 370/315; 455/445; 455/426.1; 455/456

(58) Field of Classification Search ......... 455/432.3, 455/435.3, 552.1, 553.1
See application file for complete search history.

(56) References Cited

U.S. PATENT DOCUMENTS

| | | | |
|---|---|---|---|
| 6,104,929 A * | 8/2000 | Josse et al. | 455/445 |
| 6,122,503 A * | 9/2000 | Daly | 455/419 |
| 6,188,902 B1 * | 2/2001 | Yamada | 455/445 |
| 6,243,579 B1 * | 6/2001 | Kari | 455/426.1 |
| 6,463,055 B1 * | 10/2002 | Lupien et al. | 370/353 |
| 2001/0009857 A1 * | 7/2001 | Vanttinen | 455/456 |
| 2002/0085511 A1 * | 7/2002 | Koponen et al. | 370/315 |
| 2002/0111169 A1 * | 8/2002 | Vanghi | 455/436 |
| 2002/0123348 A1 * | 9/2002 | Willars et al. | 455/436 |
| 2002/0133457 A1 * | 9/2002 | Gerlach et al. | 705/39 |
| 2003/0092390 A1 * | 5/2003 | Haumont | 455/67.1 |
| 2005/0037755 A1 * | 2/2005 | Hind et al. | 455/435.3 |
| 2006/0105810 A1 * | 5/2006 | Gnuschke | 455/558 |

* cited by examiner

*Primary Examiner*—Lester G. Kincaid
*Assistant Examiner*—Diego Herrera
(74) *Attorney, Agent, or Firm*—Michael J. Donohue; Davis Wright Tremaine LLP

(57) ABSTRACT

The present invention is directed to a system and method for providing improved wireless services in a GPRS network operating in network operation mode 1. In an embodiment of the present invention, a MS attempts a combined attach. If the combined attach is not accepted by the network, the MS repeats the attempt. If the combined attach is not accepted by the end of the second attempt, the MS attempts to gain access only to GSM services. Once the MS gains access to the GSM services, the MS may attempt the combined attach while connected to GSM network.

20 Claims, 3 Drawing Sheets

SELECTIVE RETRY OF ATTACH AND LOCATION UPDATE PROCEDURES

BACKGROUND OF THE INVENTION

1. Field of the Invention

The present invention relates generally to communication systems and, more particularly, to providing improved wireless services.

2. Description of Related Art

Global system for mobile communication (GSM) is one of the most widely used wireless access systems in today's fast growing communication systems. GSM provides circuit-switched data services to subscribers, such as mobile telephone or computer users. General Packet Radio Service (GPRS), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode data applications. FIG. 1 shows a conventional GSM/GPRS network architecture.

As shown in FIG. 1, GSM/GPRS network 100 includes a GSM core network 101 and a GPRS network 130. GSM core network 101 includes a Mobile Station (MS) 102, at least one Base Transceiver Station (BTS) 104, and a Base Station Controller (BSC) 106. MS 102 is physical equipment or Mobile Equipment (ME), such as a mobile phone or a laptop computer that is used by mobile subscribers, with a Subscriber Identity Module (SIM). The SIM includes an International Mobile Subscriber Identity (IMSI), which is a unique identifier of a subscriber. BTS 104 is physical equipment, such as a radio tower, that enables a radio interface to communicate with the MS. Each BTS may serve more than one MS. BSC 106 manages radio resources, including the BTS. The BSC may be connected to several BTSs. The BSC and BTS components, in combination, are generally referred to as a Base Station System (BSS).

GSM core network 101 also includes a Mobile Switching Center (MSC) 108, a Gateway Mobile Switching Center (GMSC) 110, a Home Location Register (HLR) 112, a Visitor Location Register (VLR) 114, an Authentication Center (AuC) 116, and an Equipment Identity Register (EIR) 118. MSC 108 performs a switching function for the network. The MSC also performs other functions, such as registration, authentication, location updating, handovers, and call routing. GMSC 110 provides a gateway between the GSM network and other networks, such as an Integrated Services Digital Network (ISDN) or Public Switched Telephone Networks (PSTNs) 120. In other words, the GMSC provides interworking functionality with external networks.

HLR 112 is a database that contains administrative information regarding each subscriber registered in a corresponding GSM network. The HLR also contains the current location of each MS. VLR 114 is a database that contains selected administrative information from the HLR. The VLR contains information necessary for call control and provision of subscribed services for each MS currently located in a geographical area controlled by the VLR. The HLR and the VLR, together with the MSC, provide the call routing and roaming capabilities of GSM. AuC 116 provides the parameters needed for authentication and encryption functions. Such parameters allow verification of a subscriber's identity. EIR 118 stores security-sensitive information about the mobile equipment.

To gain access to GSM services, such as speech, data, and short message service (SMS), the MS first registers with the network to indicate its current location by performing a location update and IMSI attach procedure. The MS sends a location update message including its current location information to the MSC/VLR, via the BTS and the BSC. The location information is then sent to the MS's HLR. The HLR is updated with the location information received from the MSC/VLR. The location update is also performed when the MS moves to a new location area. Typically, the location update is periodically performed to update the database as location updating events occur.

GPRS network 130 is logically implemented on the GSM core network architecture by introducing two packet-switching network nodes, a Serving GPRS support node (SGSN) 132 and a Gateway GPRS support node (GGSN) 134. SGSN 132 is at the same hierarchical level as the MSC in the GSM network. The SGSN controls the connection between the GPRS network and the MS. The SGSN also keeps track of individual MS's locations and manages security functions and access controls. GGSN 134 provides a gateway between the GPRS network and a public packet data network (PDN) or other GPRS networks 136. That is, the GGSN provides interworking functionality with external packet data networks, and sets up a logical link to the MS through the SGSN. When packet-switched data leaves the GPRS network, it is transferred to an external TCP-IP network 136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. Class A MS also supports simultaneous operation of GPRS services and GSM services. For example, class A mobiles can receive GSM voice/data/SMS calls and GPRS data calls at the same time.

A class B MS also can attach to the network for both GPRS services and GSM services simultaneously. However, a class B MS does not support simultaneous operation of GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

Currently, a GPRS network can be designed to operate in three network operation modes NOM1, NOM2, and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In NOM1 network, a MS can receive pages from a circuit switched domain (voice call) when engaged in a data call. The MS can suspend the data call or take both simultaneously, depending on the ability of the MS. In NOM2 network, a MS may not receive pages from a circuit switched domain when engaged in a data call, since the MS is receiving data and is not listening to a paging channel. In NOM3 network, a MS can monitor pages from a circuit switched network while receiving data and vice versa.

In NOM 1, a MS performs a combined attach procedure. The combined attach is similar to the GSM registration process where the MS performs a location update and IMSI (GPRS) attach. The MS initiates the combined attach procedure by sending a request to the network for both location update for circuit switched operation and GPRS attach for packet switched services. FIG. 2 shows a combined attach procedure in accordance with existing GSM/GPRS standards. The MS first sends an ATTACH REQUEST message including the IMSI to the SGSN, and starts a first timer set to expire after 15 seconds. The SGSN receives the message from the MS via a Gb interface (see FIG. 1). The SGSN may authenticate the MS. The SGSN then sends a LOCATION UPDATE REQUEST message to the MSC/VLR, via a Gs interface, for the location update procedure. The location update procedure establishes SGSN-VLR association and allows the VLR to maintain current location information of the MS. Once the location update procedure is completed, a LOCATION UPDATE ACCEPT message is sent to the SGSN. If the combined attach is accepted by the network, the SGSN sends an ATTACH ACCEPT message including a location area identification (LAI) to the MS. Upon receiving the ATTACH ACCEPT message, the MS stores the LAI and stops the first timer. The MS then sends an ATTACH COMPLETE message to the SGSN.

In accordance with existing standards, if the combined attach is not accepted by the network by the first expiry of the first timer, the MS resets and restarts the first timer, and the MS retransmits the ATTACH REQUEST message. This retransmission is repeated four times for a total of about one minute of attempts. On the fifth expiry of the first timer, the combined attach procedure is aborted and an attach attempt counter is incremented. If the attach attempt counter is less than five, a second timer, set to expire after 15 seconds, is started. Upon the expiry of the second timer, the combined attach procedure is repeated. When the attach attempt counter reaches five, the MS-aborts the combined attach procedure and starts a third timer. The MS then receives an ATTACH REJECT message, which includes a reject cause, from the network. If the rejection cause included in the ATTACH REJECT message indicates that the GPRS is the cause of the rejection, the MS attempts to gain access only to the GSM services by performing the location update procedure. The MS sends a location update message directly to the MSC/VLR.

Thus, under present GSM/GPRS standards, when a combined attach is not accepted by the network, a MS attempts the combined attach for about 25 times (i.e., for more than seven minutes) before the MS attempts to gain access only to GSM services. During this time period, the MS (i.e., a subscriber) is unable to receive any GSM services, even though the GSM network may be available to the MS.

SUMMARY OF THE INVENTION

The present invention provides a method for providing improved wireless services in a GPRS network.

In the present invention, a MS attempts a combined procedure in NOM 1 substantially in accordance with existing standards. However, instead of waiting over seven minutes before attempting to gain access only to GSM services, the present invention reduces the period of the timers and/or the number of attempts for the combined procedure before attempting to gain access only to GSM services. Thus, the present invention reduces the waiting time before attempting to gain access only to GSM services when a combined procedure is not accepted by a network. Consequently, it is possible in accordance with the present invention to eliminate the possibility of a network anomaly in the packet switched domain from preventing a subscriber to receive circuit switched features, such as voice calls.

Once the MS gains access to the GSM services, the MS may set a different timer to periodically attempt the combined procedure while connected to the GSM network. Alternatively, the MS may wait for a period of time, for example, until a periodic location update timer expires or until a location area border is crossed, before attempting the combined procedure again.

The present invention can be applied to a combined attach procedure. The present invention also can be applied to a combined location update procedure. Further, the present invention can be applied even when the rejection cause indicates the failure in both of the GSM and GPRS.

DETAILED DESCRIPTION OF THE INVENTION

Reference will now be made in detail to a preferred embodiment of the present invention, an example of which is illustrated in the accompanying drawings.

Figure 1:
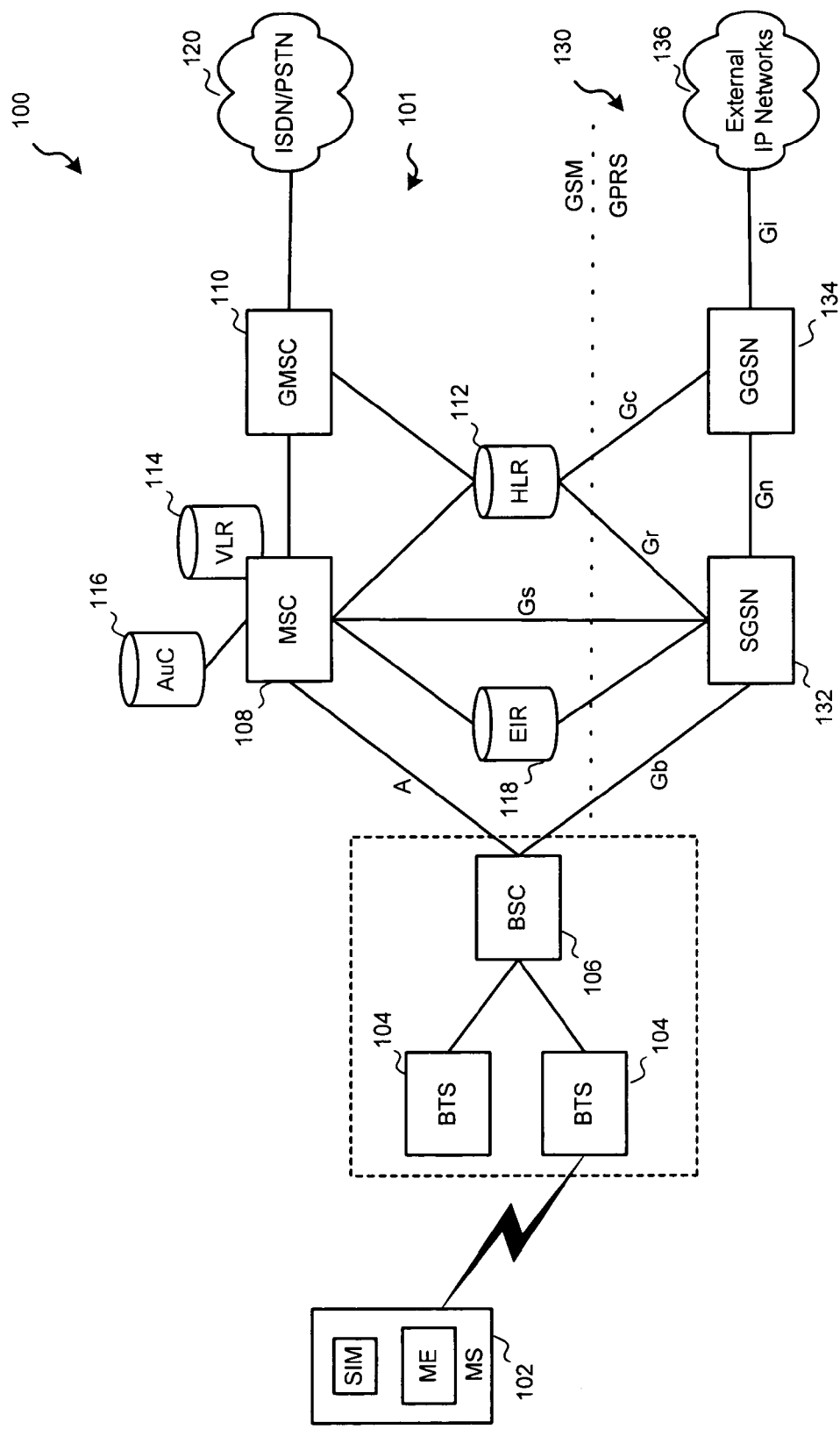
FIG. 1 illustrates a conventional GPRS network architecture.
Figure 2:
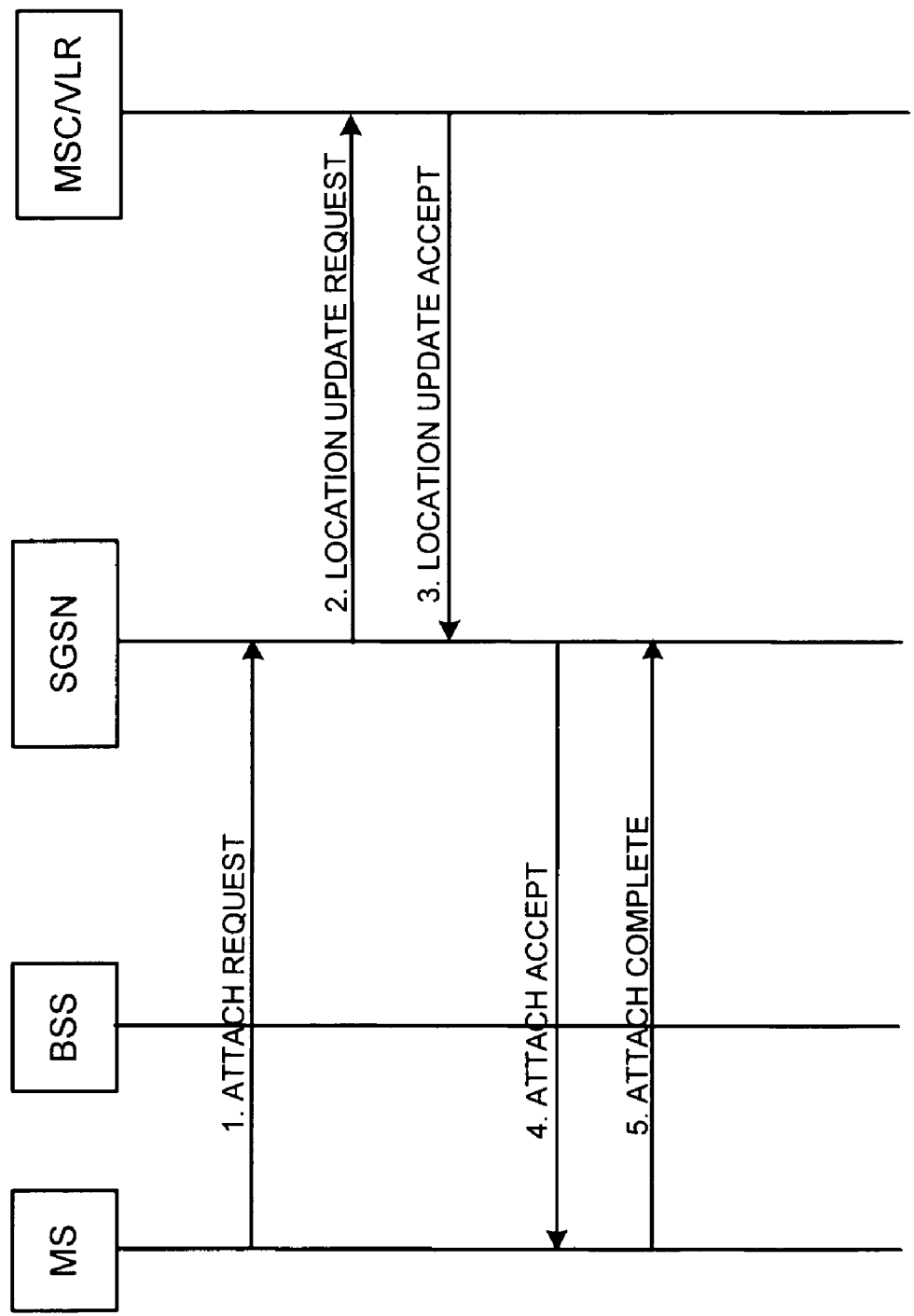
FIG. 2 illustrates a combined attach procedure in a GPRS network operating in NOM 1.
Figure 3:
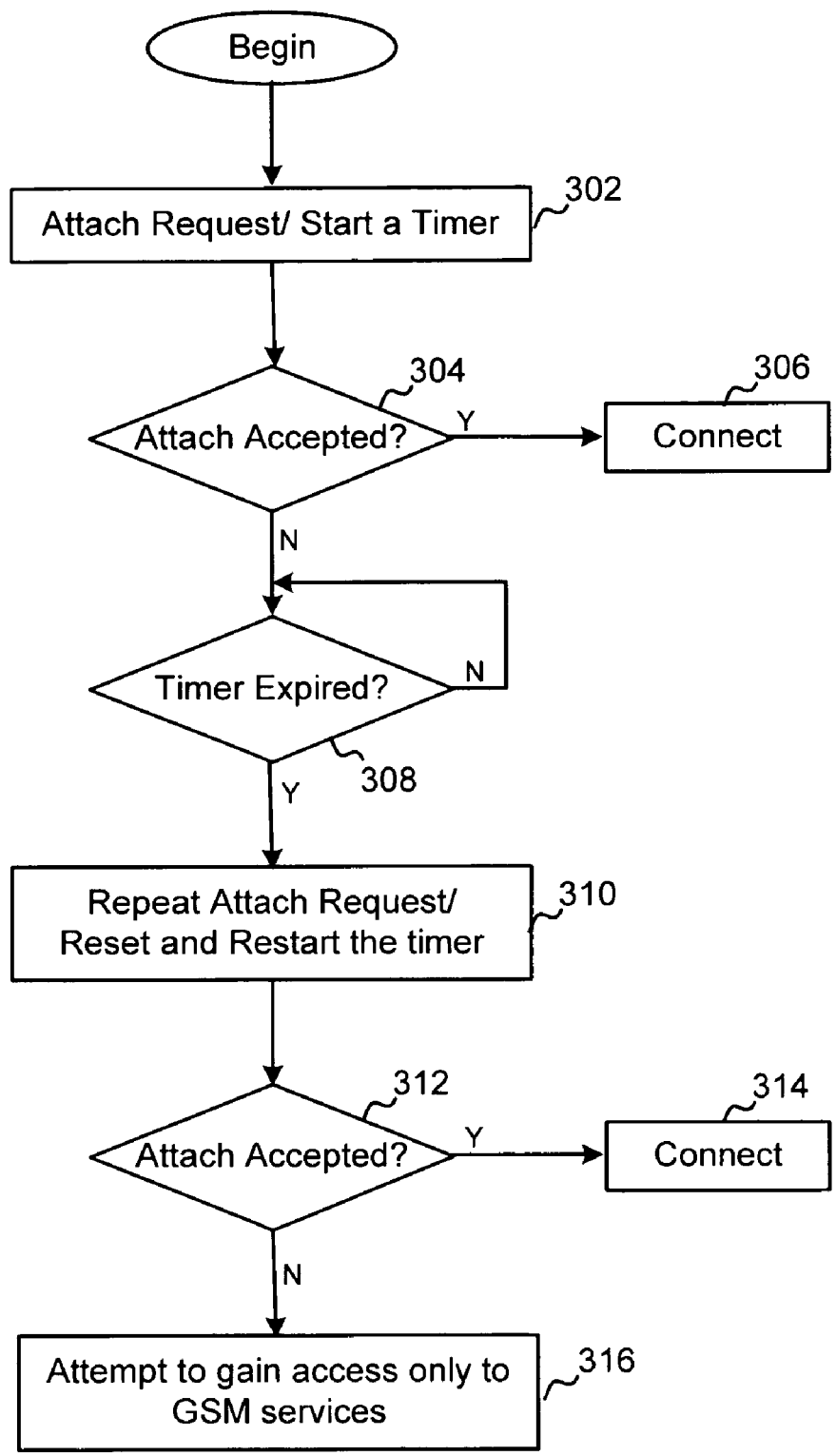
FIG. 3 is flow chart illustrating an exemplary series of steps in accordance with the present invention.

FIG. 3 is a flow chart illustrating an exemplary series of steps in accordance with the present invention. In this exemplary series of steps, a MS initiates a combined attach procedure in a GPRS network operating in NOM 1. The MS sends an ATTACH REQUEST message to a SGSN (shown in FIG. 1) and starts a timer at step 302. If the combined attach is accepted by the network at step 304, the MS receives an ATTACH ACCEPT message from the SGSN. The MS then stops the timer and sends an ATTACH COMPLETE message to the SGSN. The MS is now attached to GSM/GPRS network at step 306.

If the combined attach is not accepted by the network at step 304, the MS waits until the timer expires. When the time expires at step 308, the MS repeats the transmission of the ATTACH REQUEST message at step 310. The MS also resets and restarts the timer. If the combined attach is accepted by the network at step 312, the MS is attached to the network at step 314. Otherwise, if the combined attach is not accepted by the network at step 312, the MS attempts to gain access only to GSM services by performing a location update and IMSI attach procedure at step 316.

Once the MS gains access to the GSM services, the MS may set a different timer to periodically attempt the combined attach procedure while connected to a GSM network. Alternatively, the MS may wait for a period of time before attempting the combined attach procedure again. The MS may wait for any timer that is running to expire before attempting the combined attach procedure again or until an update procedure must be performed due to mobility.

In the present invention, a MS attempts a combined procedure twice before attempts to gain access only to GSM services. If the timer is set to expire, for example, after 15 seconds in the present invention, a MS waits for about 30 seconds before attempting to gain access only to GSM services, compare to about seven minutes required by present GSM/GPRS standards. Thus, the present invention reduces the waiting time before attempting to gain access only to GSM services when a combined attach procedure is not accepted by a network. Further, the present invention can eliminate the possibility of a network anomaly in the packet switched domain of preventing a subscriber to receive circuit switched features, such as voice calls.

The present invention also has applicability in a periodic combined location/routing update procedure. Further, the present invention can be applied even when the rejection cause indicates the failure in both of the GSM and GPRS networks since the failure might have occurred early on in the combined procedure in a subsystem of the packet switched domain.

The foregoing disclosure of the preferred embodiment of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiment of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. In a GPRS network operating in network operation mode 1, a method of reducing an amount of time necessary to complete at least one form of connectivity when a first attempt for a combined procedure is not accepted by the network, the method comprising:
    setting a first timer after the first attempt;
    performing a second attempt for the combined procedure; and
    attempting to gain access only to GSM services of the network immediately and unconditionally after the second attempt for the combined procedure is not accepted by the network;
    setting a second timer if access to GSM-only services of the network is gained; and
    based upon the second timer, attempting the combined procedure to the network upon gaining access to the GSM-only services.

2. The method of claim 1, further comprising attempting the combined procedure periodically based upon the second timer after gaining access to the GSM-services.

3. The method of claim 1, wherein the combined procedure is a combined attach procedure.

4. The method of claim 1, wherein the combined procedure is a combined location update procedure.

5. A method for reducing an amount of time necessary to complete at least one form of connectivity between a mobile device and a GPRS network operating in network operation mode 1, comprising:
    attempting a combined attach procedure to the network;
    starting a first timer;
    if the combined attach procedure is not accepted by a first expiry of the first timer,
    repeating the attempt for the combined attach procedure to the network;
    resetting and restarting the first timer; and
    attempting to gain access only to GSM services of the network immediately after and as a direct result of a second expiry of the first timer if the combined attach procedure is not accepted by the second expiry of the first timer;
    setting a second timer if access to GSM-only services of the network is gained; and
    based upon the second timer, attempting the combined procedure to the network upon gaining access to the GSM-only services.

6. The method of claim 5, wherein the second timer is used to periodically attempt the combined attach procedure upon gaining access to the GSM services.

7. The method of claim 5, further comprising attempting the combined attach procedure after waiting for a period of time according to the second timer upon gaining access to the GSM services.

8. A method for reducing an amount of time necessary to complete at least one form of connectivity between a mobile device and in a GPRS network operating in network operation mode 1, comprising:
    attempting a combined location update procedure to the network;
    starting a first timer;
    if the combined location update procedure is not accepted by a first expiry of the first timer,
    repeating the attempt for the combined location update procedure to the network;
    resetting and restarting the first timer; and
    attempting a GSM-only location update procedure to the network immediately after and as a direct result of a second expiry of the first timer if the combined location update procedure is not accepted by the second expiry of the timer;
    setting a second timer if the GSM-only location update is accepted by the network, and
    based upon the second timer, attempting the combined location update procedure upon acceptance of the GSM-only location update.

9. The method of claim 8, wherein the second timer is used to periodically attempt the combined location update once the GSM-only location update is accepted by the network.

10. The method of claim 8, further comprising attempting the combined location update after waiting for a period of time according to the second timer once the GSM-only location update is accepted by the network.

11. A method of reducing an amount of time to connect to a network when a first attempt for a combined procedure is not accepted by the network, the method comprising:
    performing a first attempt of a combined procedure to the network;
    performing a second attempt to the combined procedure to the network if the network does not accept the first attempt of the combined procedure based upon the expiration of a first timer;

attempting to gain access only to GSM services of the network immediately and unconditionally after the second attempt for the combined procedure is not accepted by the network;

setting a second timer if access to GSM-only services of the network is gained; and based upon the second timer, attempting the combined attach procedure to the network upon gaining access to the GSM-only services.

12. The method of claim 11, wherein the second timer is used to periodically attempt the combined procedure upon gaining access to the GSM services of the network.

13. The method of claim 11, further comprising attempting the combined procedure after waiting for a period of time according to the second timer upon gaining access to the GSM services.

14. The method recited in claim 13, wherein the second timer is set to approximately 15 seconds.

15. The method recited in claim 12, wherein the periodically attempting the combined procedure is performed until GPRS services are obtained.

16. The method of claim 12, wherein the combined procedure is a combined attach procedure.

17. The method of claim 12, wherein the combined procedure is a combined location update procedure.

18. A method of reducing an amount of time to connect to a network when a first attempt for a combined procedure is not accepted by the network, the method comprising:

performing a first attempt of a combined procedure to the network;

performing a second attempt of the combined procedure to the network if the network does not accept the first attempt of the combined procedure before the expiration of a first timer;

attempting to gain access only to GSM services of the network immediately and unconditionally after the second attempt for the combined procedure is not accepted by the network, wherein the total time for performing the first and second attempts is less than 120 seconds;

setting a second timer if access to GSM-only services of the network is gained; and based upon the second timer, attempting the combined procedure to the network upon gaining access to the GSM-only services.

19. The method of claim 18, wherein the combined procedure is a combined attach procedure.

20. The method of claim 18, wherein the combined procedure is a combined location update procedure.

* * * * *